United States Patent [19]

Louie

[11] 4,152,761

[45] May 1, 1979

[54] MULTI-TASK DIGITAL PROCESSOR EMPLOYING A PRIORITY

[75] Inventor: Glenn Y. Louie, Mountain View, Calif.

[73] Assignee: Intel Corporation, Santa Clara, Calif.

[21] Appl. No.: 709,402

[22] Filed: Jul. 28, 1976

[51] Int. Cl.² .............................................. G06F 9/18
[52] U.S. Cl. .................................................. 364/200
[58] Field of Search .................. 340/172.5; 445/1; 364/200 MS File, 900 MS File

[56] References Cited

U.S. PATENT DOCUMENTS

| | | | |
|---|---|---|---|
| 3,079,082 | 2/1963 | Scholten et al. | 364/200 |
| 3,312,951 | 4/1967 | Hertz | 364/200 |
| 3,421,150 | 1/1969 | Quosig et al. | 340/172.5 |
| 3,496,551 | 2/1970 | Driscoll et al. | 340/172.5 |
| 3,530,438 | 9/1970 | Mellen et al. | 340/172.5 |
| 3,566,357 | 2/1971 | Ling | 364/200 |
| 3,614,740 | 10/1971 | Delagi et al. | 364/200 |
| 3,643,227 | 2/1972 | Smith et al. | 340/172.5 |
| 3,648,252 | 3/1972 | Thron et al. | 364/200 |
| 3,665,404 | 5/1972 | Werner | 364/200 |
| 3,774,163 | 11/1973 | Recoque | 364/200 |
| 3,825,902 | 7/1974 | Brown et al. | 364/200 |
| 3,828,325 | 8/1974 | Stafford et al. | 340/172.5 |
| 3,916,383 | 10/1975 | Malcolm | 340/172.5 |
| 4,001,783 | 1/1977 | Monahan et al. | 340/172.5 |
| 4,009,470 | 2/1977 | Danilenko et al. | 340/172.5 |
| 4,020,471 | 4/1977 | Woods et al. | 364/200 |
| 4,047,161 | 9/1977 | Davis | 364/200 |

*Primary Examiner*—Melvin B. Chapnick
*Attorney, Agent, or Firm*—Blakely, Sokoloff, Taylor & Zafman

[57] ABSTRACT

A digital processor programmed to perform multi-tasks which includes a hardware dispatcher for selecting tasks. The dispatcher receives a plurality of dispatcher requests and determines the highest priority request. The dispatcher then selects the appropriate program routine. Each routine is divided into segments, and the status of the routines are stored in registers. When a routine is selected, the appropriate segment in the routine is also selected. At the end of each segment the dispatcher requests are re-examined.

9 Claims, 4 Drawing Figures

MULTI-TASK DIGITAL PROCESSOR EMPLOYING A PRIORITY

BACKGROUND OF THE INVENTION

1. Field of the Invention

The invention relates to the field of multi-task processors which employ hardware dispatchers.

2. Prior Art

In some digital processing applications it is necessary for a single digital processor to perform numerous, distinct tasks. One such application is where a digital processor is used as a peripheral unit for a digital computer. In this case the processor may be used to receive information from (and communicating information to) a disk or a synchronous data link. In this application, by way of example, the processor may be called upon to examine the incoming data for errors, re-format the data, act as a buffer for a direct memory access unit, count data bytes, and control the flow of data in various buffers coupled to the computer or to a data source, in addition to many other tasks.

A multi-task processor must include means for establishing the order in which the various tasks are performed. For effective and efficient use the processor must be able to establish this order based on a set of priorities. For example, a high priority task may be one which is necessary for continuous flow of data from a data source. Lower priority "housekeeping" tasks must be delayed until the higher priority tasks are completed (or partially completed). This ordering or selection of tasks requires a dispatcher or dispatching operation.

Most single-task digital processors can be programmed to do multiple tasks. However, this requires a program for the dispatching operation, that is, a program to determine which tasks need performing and the order in which they should be performed. The program must select the highest priority request and then generate a jump address to the memory location for the appropriate routine. Moreover, a location within each of the routines must be found since efficient operation requires changing from one task to another before the completion of a task. For example, after a task is partially accomplished, the priorities may change requiring another routine. When the processor returns to the first task it must begin where it left off. In many practical applications this dispatching operation requires an intolerable amount of time.

The disclosed processor with its hardware dispatcher provides an efficient and effective means for controlling a multi-task processor.

SUMMARY OF THE INVENTION

A multi-task digital processor is described which includes a memory means programmed with a plurality of routines. Each routine includes the instructions necessary to perform one of the processor tasks. A dispatcher is employed for selecting the highest priority routine and for determining the status of that routine. The dispatcher includes a priority resolver which resolves a plurality of request signals each representing a routine. Information on the status of each routine is stored in a storage means coupled to the resolver. Also included are means for updating the status information stored in the storage means to insure that the proper segment of each routine is selected.

DETAILED DESCRIPTION OF THE INVENTION

A multi-task digital processor is described which includes a hardware dispatcher for selecting routines stored within the processor's memory. In general, the dispatcher receives a plurality of request (input) signals and resolves these requests based on a predetermined priority scheme. The routine for performing one of the tasks is then selected. The output of the priority resolver, in addition to selecting a routine, in some cases, selects one of a plurality of case registers. These case registers store information on the status of the tasks. The case register information is used to select a particular segment of a routine. A novel logic tree is employed to resolve the priority of the dispatcher request inputs.

In the presently preferred embodiment, the entire multi-task digital processor, including the dispatcher, is fabricated on a single silicon substrate employing known MOS technology. The processor employs n-channel devices which include polycrystalline silicon gates. However, it will be apparent that the processor may be fabricated employing other semiconductor technology. In numerous instances in the following disclosure, well-known detail circuitry for performing known functions has not been included, in order not to over complicate this application. In other instances, very specific details, such as specific encoding circuits, multiplexing circuits, word lengths and specific processor tasks are described to better illustrate the inventive concepts. As will be appreciated, the inventions described herein may be practiced in numerous other embodiments which embodiments will be obvious to one skilled in the art.

Figure 1:
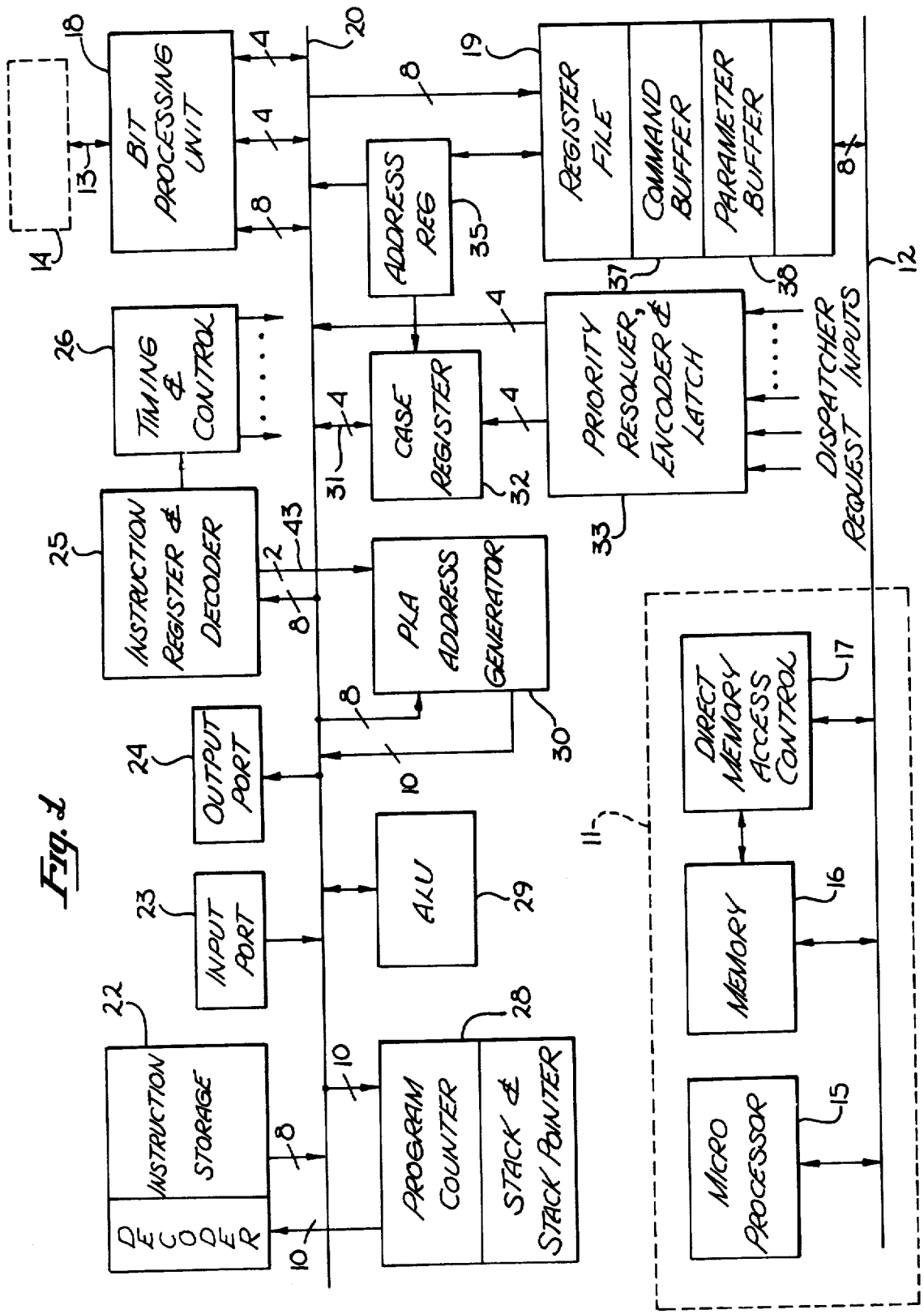
FIG. 1 is a general block diagram of a digital processor which includes the invented dispatcher.

Referring now to FIG. 1, the digital processor is shown coupled to external units which units are shown within dotted lines 11 and 14. By way of example, the bus 13 may be employed to couple the processor to a floppy disk, sychronous data link, or other sources of data. The bus 12 may couple the processor to a digital computer which computer may include a micro-processor 15, a memory 16 and a direct-memory access control unit 17. The processor may be used to receive and transmit data to and from an external data storage means (such as a floppy disk) via bus 13, and to control the flow of this data to the digital computer shown within dotted line 11. The processor may perform a plurality of known functions on the data.

The processor of FIG. 1 includes a bit processing unit 18, in its presently preferred embodiment, which receives and transmits data in serial form on the bus 13. The bit processing unit 18 upon receiving the data in serial form, performs known test on the data, and then communicates the data in bytes via bus 20 to the register file 19. From the register file 19 the data is communicated to the digital computer via bus 12. Data received by the processor in bytes on bus 12 is serialized by unit 18 for transmission over bus 13. The bit processing unit 18 and register file 19 may employ well-known circuitry.

An instruction storage means 22 is coupled to bus 20. (The bus 20 of the processor is used to communicate signals to various portions of the processor.) In the presently preferred embodiment, this storage means comprises a read-only memory with decoders for decoding a ten-bit address. This address is used to locate an 8-bit instruction which instruction is communicated to the instruction register and instruction decoder 25. The instruction register and decoder 25 decodes each instruction, and then communicates the proper command to the timing and control means 26. A conventional program counter 28 may receive for certain instructions the 10-bit address for the instruction storage means via the bus 20 or it may increment the address. The program counter 28 also includes a stack and a stack pointer which are employed in a known manner.

As will be described in more detail, the instruction storage means 22 is programmed with a plurality of routines; each routine includes a plurality of instructions for performing a specific processor task. The tasks may include known data processing tasks such as re-formatting data, performing parity and other checks on data, transferring data, receiving special instructions or data via the input port 23, transmitting data or instructions via the output port 24, performing arithmetic operations on the data within the arithmetic logic unit 29, count data bytes, and numerous other tasks.

The addresses which are communicated to the program counter via the bus 20 are generated within a task dispatcher which includes the priority resolver, encoder and latch 33, a case register 32, address register 35, and a programmed logic array (PLA) address generator 30. The function and operation of the task dispatcher will be described in more detail in conjunction with FIGS. 2, 3, and 4.

In general, priority resolver, encoder and latch 33 receives a plurality of dispatcher request inputs from the processor, or from external sources. The priority resolver examines these inputs to determine the highest priority request. The encoder portion of this means then generates a 4-bit signal which is communicated to the PLA address generator 30, via bus 20. These 4-bits are employed by the PLA address generator 30 to generate a portion of an address which portion is used to identify one of the routines. The 4-bits generated by the priority resolver 33 are also communicated to a case register 32 (with exceptions which will be discussed). These 4-bits couple one of the registers within case registers 32 (via lines 31) to bus 20 and provide an additional 4-bits of information to the PLA address generator. These 4-bits are employed by the address generator to generate another portion of the address, which portion identifies a segment of the selected routine. That is, as will be seen, routines are not necessarily completed when selected, and thus when a particular routine is again selected it is continued at the beginning of the appropriate segment. The PLA address generator 30 also receives 2-bits of information from the instruction register 25 via lines 43. The address register 35 (which is part of the instruction register and decoder 25) provides a means for selecting case registers in order that the information in the case registers may be updated.

The various portions of the processor described above and in particular the instruction storage means 22, program counter 28, arithmetic logic unit 29, input and output ports 23 and 24, instruction register and decoder 25, timing and control means 26, and the PLA address generator 30 may be fabricated employing well-known circuits.

Figure 2:
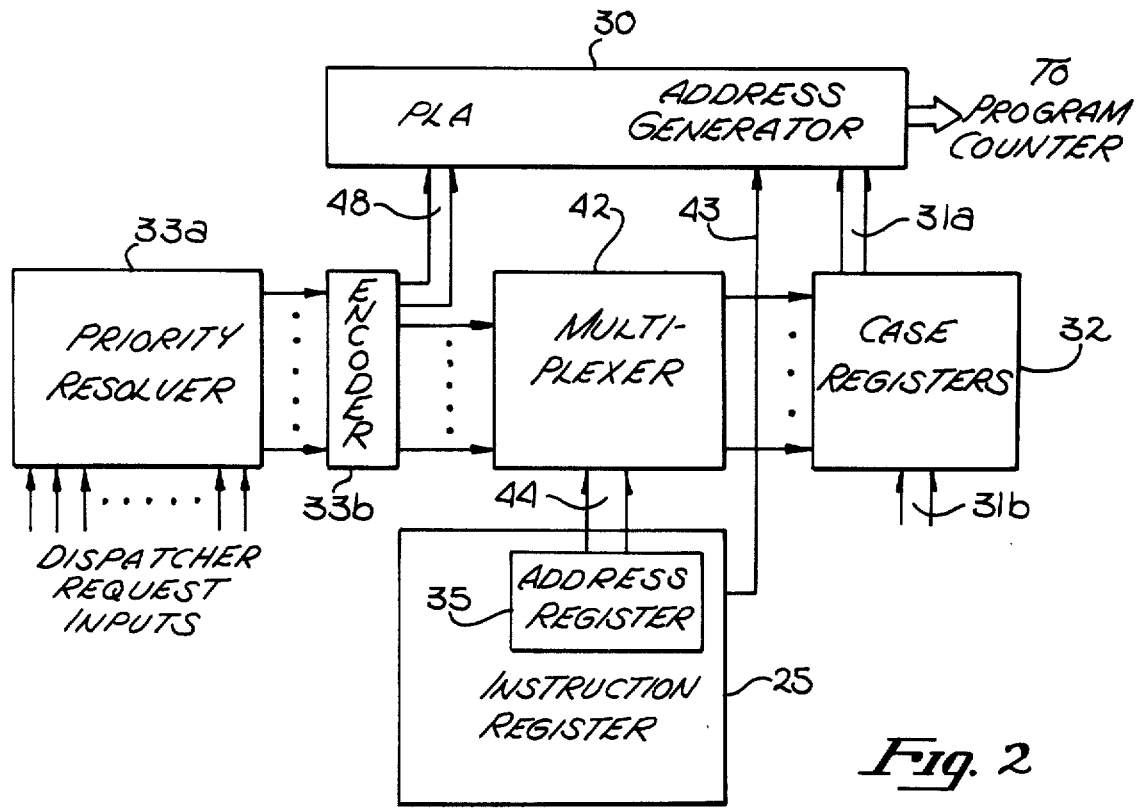
FIG. 2 is a block diagram of mainly the dispatcher portion of the processor of FIG. 1.

Referring now to FIG. 2 the dispatcher employed by the processor is shown in more detail, and again includes a priority resolver 33a which receives a plurality of inputs identified as dispatcher request inputs. These inputs are examined by the priority resolver in accordance with predetermined logic to select the highest priority request, and to provide a signal representative of this request to the encoder 33b. Known logic circuits, particularly employing standard AND, OR and NOR gates may be employed for the priority resolver 33a. However, in the presently preferred embodiment, a logic tree is employed which will be described in detail in conjunction with FIG. 4. This logic tree permits the resolution of the input requests with a minimum number of components.

Examples of the dispatcher request inputs may include a signal that indicates a particular buffer (such as the buffer coupled to bus 13) is empty, that a command buffer such as command buffer 37 (FIG. 1) has received an external command, or that the parameter buffer 38 (FIG. 1) is filled. The parameter buffer data may indicate, by way of example, the sector and track number on a floppy disk. Other types of requests or input signals to the dispatcher may include a direct memory access overrun or a request to count the transfer of data from file register 19 to bus 12. As will be appreciated, the specific dispatcher requests and the priorities assigned to these requests will be a function of the particular processor and the tasks which it is programmed to accomplish.

The output lines of the priority resolver 33a (FIG. 2) are coupled to an encoder 33b, and also to a multiplexer 42. In the presently preferred embodiment, a signal appears on only one of the output lines of the priority resolver which signal indicates the highest priority request. This signal is encoded (into 4-bits) by the encoder 33b and coupled to the PLA address generator 30 on lines 48. Any one of a plurality of known encoding means may be employed for encoder 33b. A specific embodiment shall be described in conjunction with FIG. 4.

The multiplexer 42 is employed to select signals either from the priority resolver 33a or from the address register 35. (Note that in FIG. 2 the address register 35 is shown as part of the instruction register 25.) The multiplexer 42 selcts a single register from the plurality of registers included within case registers 32. The selection of this register is controlled by the output of either the priority resolver or the address register 35. The contents of the selected case register are communicated to the address generator 30, via 31a. The information within any of the registers may be updated or changed as indicated by lines 31b. Note that the bidirectional lines 31 of FIG. 1 have been separated into unidirectional lines 31a and 31b in FIG. 2 for sake of discussion. A single register of case registers 32 is associated with each routine to store the status of that routine. However, no case registers are used for those routines which are completed once begun.

Figure 3:
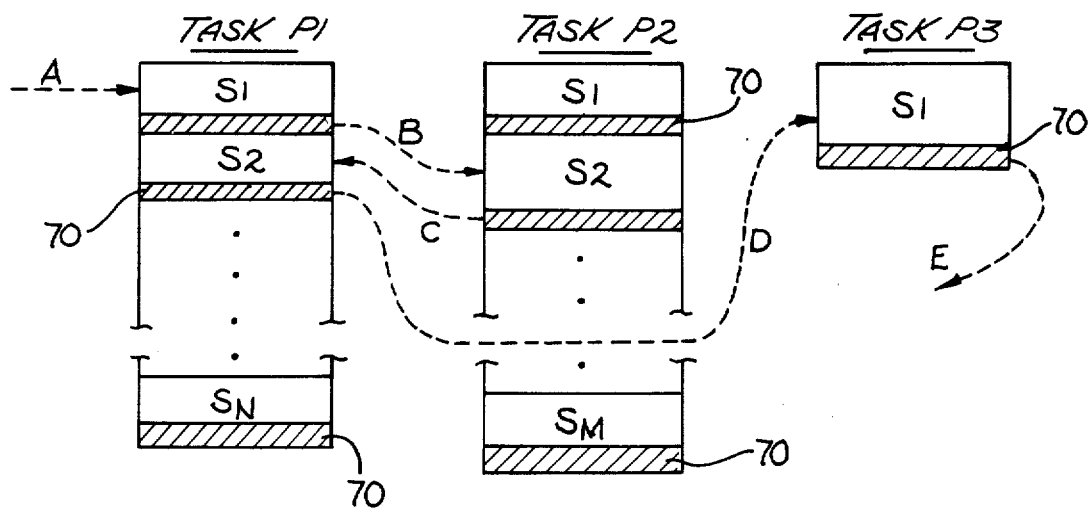
FIG. 3 is a diagram used to illustrate routines stored in memory and the manner in which the processor changes from one routine to another; and, FIG. 4 is a schematic drawing illustrating the priority tree employed by the dispatcher and the interconnecting circuitry between the priority tree and the case registers.

Before the operation of the task dispatcher of FIG. 2 is described, it will be helpful to understand the manner in which the instruction storage means 22 of FIG. 1 is programmed, and for that purpose reference is made to FIG. 3. The event driven program includes a plurality of separate routines each of which is employed for performing a particular processor task. In FIG. 3, three such routines are shown as $P_1$, $P_2$ and $P_3$. Each routine is divided into one or more segments. For example, the routine $P_1$ includes $S_N$ segments, the routine $P_2$ includes $S_M$ segments, and the routine $P_3$ includes a single segment, $S_1$. Each segment may include a plurality of instructions, and in fact may call upon a subroutine. Some segments may be repeated in part, for example, where a segment is used to count. A special instruction identified herein as "priority check" is included at the end of each segment, and also at the end of each routine. This special instruction is shown as the lined areas 70 in FIG. 3. This instruction causes the priority resolver 33a to examine the dispatcher request inputs and if the priorities have changed, a "jump" address is provided to the program counter 28.

In the following explanation of the dispatcher, numerous known signals and signal paths employed in an actual processor are not discussed in order that the inventive concepts may be readily understood. Assume that the priority resolver 33a indicates that the highest priority task requires routine $P_1$. This information is communicated to the PLA address generator 30 on lines 48. Assume further, that when the case register for routine $P_1$ is selected, it indicates that segment $S_1$ is to be performed. This information is communicated to the PLA address generator via lines 31a. The generator 30 then generates the appropriate address which is communicated to the program counter 28 of FIG. 1. This is illustrated graphically in FIG. 3 by the dotted line A. The program counter then furnishes addresses to the instruction storage means 22 and the instructions for $S_1$ are sequentially furnished, by way of example, to the instruction register 25 for interpretation. One or more of the instructions within segment $S_1$ of routine $P_1$ will cause the case registers associated with this task to be updated to indicate that $S_1$ has been accomplished. The address register 35 selects the appropriate register for this purpose.

At the end of segment $S_1$ the special instruction 70 is generated which instruction causes the priority resolver 33a to again examine the dispatcher request inputs. Assume now, that the output of the priority resolver 33a indicates that the highest priority task requires routine $P_2$. (Note that even though the entire routine $P_1$ was not completed, accomplishing a part of a task may remove a request for a task. For example, the removal of data from a particular buffer may reduce the priority of accomplishing the remainder of routine $P_1$). This information is communicated to the generator 30 via lines 48. When the case register associated with this task is selected, assume that it indicates that the next segment of routine $P_2$ which is to be performed is segment $S_2$. This is communicated to the generator 30 via line 31a from the selected case register. The generator 30 then generates the appropriate address for routine $P_2$, segment $S_2$. This is indicated by the dotted line B in FIG. 3. During this segment, the case register for routine $P_2$ is updated via line 31b.

At the completion of this segment the dispatcher request inputs are examined. Assume now, that routine $P_1$ is again required. When the case register associated with this routine is selected it indicates that segment $S_2$ is to be performed, and thus the processor executes the instructions of routine $P_1$, segment $S_2$ as indicated by the dotted line C of FIG. 3.

Assume that after the completion of segment $S_2$ of routine $P_1$ the priority resolver 33a indicates that the highest priority input requires routine $P_3$. This information is communicated again to the address generator 30 and then to the program counter. Routine $P_3$ is a single segment routine, thus there is no case register associated with this routine. As indicated by dotted line D, this task is next performed by the processor. At the end of routine $P_3$ the special instruction 70 is again reached and the processor performs the next required task based on the highest priority input to the dispatcher, as indicated by the dotted line E.

Figure 4:
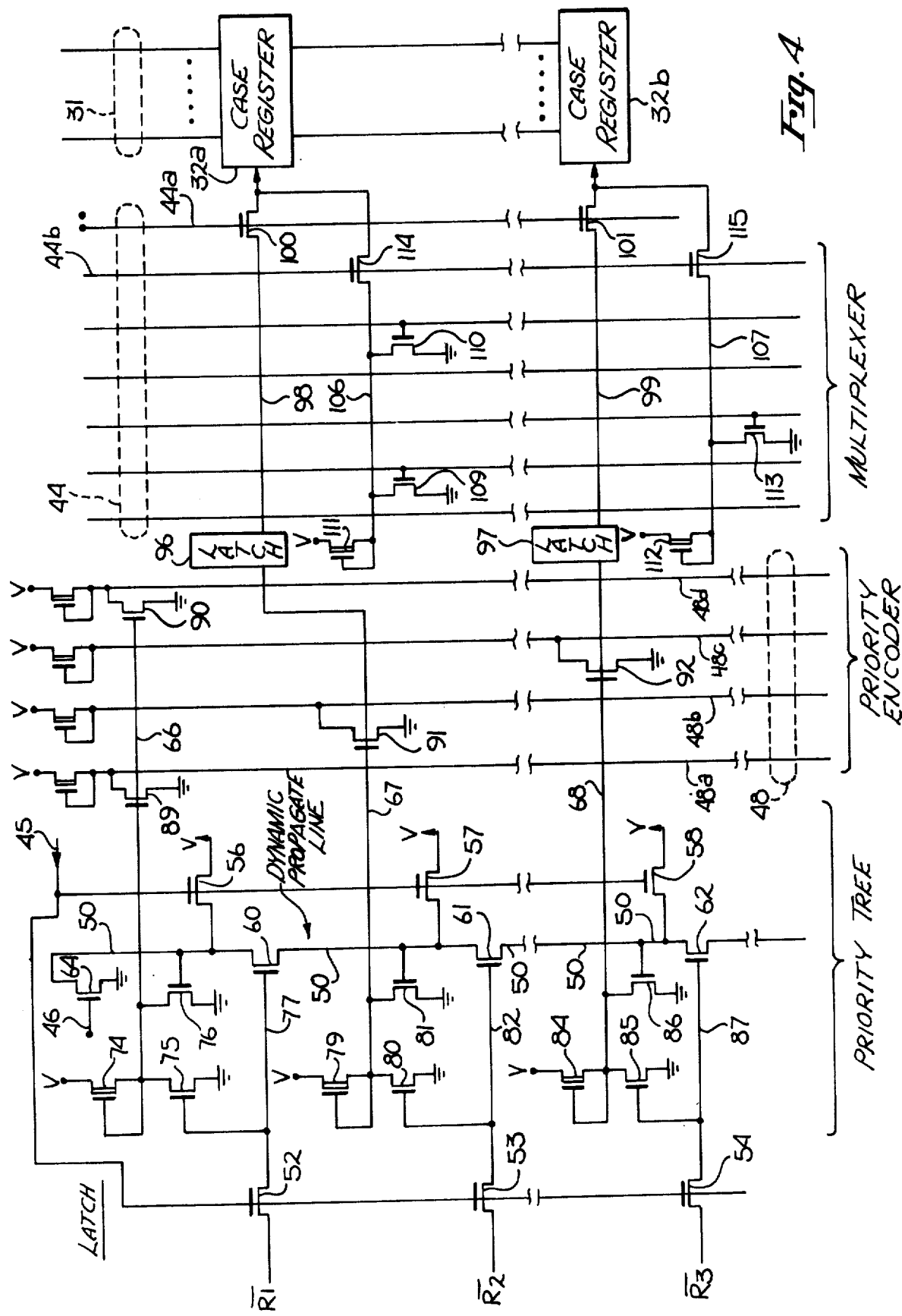

Referring to FIG. 4, the dispatcher described in conjunction with FIGS. 1 through 3 is shown in schematic form and includes a latch, a priority tree for resolving the priorities of the input signals, an encoder, a multiplexer and case registers. Three dispatcher request inputs are shown in FIG. 4 as $\overline{R}_1$, $\overline{R}_2$ and $\overline{R}_3$. (The complements of the request inputs are employed in FIG. 4). The output of the encoder 33b of FIG. 2, lines 48, are again shown in FIG. 4. The interconnections between the encoder 33b and multiplexer 42 of FIG. 2 are shown in FIG. 4 as lines 66, 67 and 68. In the schematic of FIG. 4 it is assumed that the routines associated with the signals $\overline{R}_2$ and $\overline{R}_3$ include a plurality of segments, thus there are case registers associated with these inputs. For the input $\overline{R}_1$, it is assumed that this is a single segment routine, such as the routine $P_3$ of FIG. 3, and thus there is no case register associated with this signal. It will be appreciated that while only three dispatcher request inputs are shown in FIG. 4, the circuit may be readily expanded to accommodate any number of input signals.

The $\overline{R}_1$ signal is applied through transistor 52 to line 77. The enhancement mode, field-effect transistor 52 operates as a latch for the $\overline{R}_1$ signal. In a similar manner transistor 53 couples $\overline{R}_2$ signal to line 82, and transistor 54 couples the $\overline{R}_3$ signal to line 87. The gates of transistors 52, 53 and 54 are coupled to line 45 which line receives a timing signal from the timing and control means 26 of FIG. 1.

The priority tree which performs the priority resolution function, includes a dynamic propagate line 50. This line, as will be described, is used to propagate a binary-zero. A plurality of transistors are coupled in series in this line, each of these series transistors is associated with a different one of the dispatcher request inputs. Specifically, transistors 60, 61 and 62 are coupled in series along this line; the gates of these transistors are coupled to lines 77, 82 and 87 respectively. The dynamic propagate line 50 is precharged through a plurality of transistors spaced-apart along the line such as transistors 56, 57 and 58. The gates of these transistors are coupled to line 45, thus precharging occurs simultaneously with the opening of the latches for the dispatcher requests inputs. One end of line 50 is coupled to ground when the priority is being determined through transistor 64. The gate of this transistor is coupled to line 46 which line receives a timing signal.

An active-low AND gate is associated with each of the dispatcher inputs. Each of these gates includes two inputs and an output signal. The gate associated with the $\overline{R}_1$ signal includes transistor 74 and 75 coupled in series between a positive potential and ground. The common terminal between these transistors which is the output of the gate (line 66) is coupled to the gate of the depletion mode transistor 74 and to ground through transistor 76. One input to this gate is the $\overline{R}_1$ signal (line 77) which is coupled to the gate of transistor 75. The other input signal is obtained from the line 50. For this purpose, the gate of transistor 76 is coupled to line 50 between the source terminal of transistor 60 and the ground connection obtained through transistor 64. Similarly, the input signal $\overline{R}_2$, includes a low-active AND gate which comprises transistors 79, 80 and 81 coupled in a similar manner to lines 50 and 82; and, the input signal $\overline{R}_3$, includes a low-active AND gate comprising transistors 84, 85 and 86 similarly coupled to lines 50 and 87.

The priority encoder output lines 48 are each coupled to a source of positive potential through a depletion mode transistor. Transistors for coding are provided along each of the lines 48 to obtain a predetermined code. For example, transistors 89 and 90 selectively couple lines 48a and 48d, respectively, to ground when a positive signal is present on line 66. Similarly, transistor 91 couples line 48b to ground when a positive potential is present on line 66, and transistor 92 couples line 48c to ground when a positive potential is present on line 68. As will be appreciated the specific coding employed is substantially arbitrary.

Lines 67 and 68 are coupled to the multiplexer through ordinary latches 96 and 97, respectively. The output of the latch 96, is coupled to the case register 32a through a transistor 100, and similarly the latch 97 is coupled to the case register 32b through the transistor 101. The gates of transistors 100 and 101 are coupled to line 44a. One terminal of transistor 100 is coupled to a source of positive potential through transistor 114, line 106, and the depletion mode transistor 111. Line 106 may be selectively coupled to ground by transistors 109 and 110 when positive potentials appear on the lines 44 coupled to the gates of transistors 109 and 110. Similarly, one terminal of transistor 101 is coupled to a source of positive potential through transistor 115, line 107, and a depletion mode transistor 112. The line 107 may be selectively coupled to ground through transistor 113 when a positive signal appears on the line 44 coupled to the gate of this transistor. The gates of transistors 114 and 115 are coupled to line 44b.

Each of the case registers, such as registers 32a and 32b, may be ordinary digital registers which communicate with lines 31 when a signal is received by the register from the multiplexer. In the presently preferred embodiment each case register has a 4-bit capacity.

In operation, only one output signal occurs from the priority tree for any set of request inputs. That is, only one of lines 66, 67 or 68 will be positive even if a request signal occurs on all the input lines. (While not illustrated in FIG. 4 the lowest priority input to the priority tree consists of an "idle" signal used to assure an output from the tree when there are no other requests.) The priority of the signals on the input lines is determined by their position along the line 50. For example, the $R_1$ signal has the highest priority since it is closest to the discharge transistor 64, $R_2$ is next in priority, and so on.

Assume for the sake of discussion that $R_2$ and $R_3$ are positive indicating a request for a task while $R_1$ is low. For these conditions the $\overline{R}_1$ signal is high, while the $\overline{R}_2$ and $\overline{R}_3$ signals are low.

In operation first a positive signal is applied to line 45. This enables the latching transistors 52, 53 and 54, thereby storing the complements of the request inputs on lines 77, 82 and 87, respectively. Then positive signal on line 45 also causes transistors 56, 57 and 58 to conduct, thereby charging the propagate line 50. When the signal on line 45 is removed the complements of the request inputs are stored, and the line 50 remains charged. A signal is then applied to line 46 coupling one end of line 50 to ground through transistor 64.

A zero will propagate along line 50 until it reaches the first series transistor in this line which is not conducting. That is, line 50 will discharge to the source terminal of transistor 61 since line 77 is positive (that is, transistor 60 is conducting) and line 82 is low, preventing transistor 61 from conducting. The active-low AND gate consisting of transistors 78, 80 and 81 thus receives two low inputs, one on line 50 and the other on line 82. This prevents transistors 80 and 81 from conducting, thereby coupling the output line 67 to the positive potential through the depletion mode transistor 79. Note that line 66 remains low since line 77 is charged, thus coupling this line to ground through transistor 75. Line 68 is also low even though line 87 is low since the zero propagated along line 50 did not pass through transistor 61. That is, the gate of transistor 86 remains charged, thereby coupling line 68 to ground through this transistor.

The coincidence of a zero on the propagate line 50 and an active low request input will activate an output line. All the output lines above this selected line must be low, since for the zero to propagate down the line the complement of the higher priority requests must have been positive. All the output lines below the selected line will likewise be low since the remainder of the propagate line 50 remains charged.

The positive signal on line 67 causes transistor 91 to conduct and thereby provides a unique set of signals on the lines 48. As is apparent if a signal appeared on line 66 or line 68 other coded signals would appear on the lines 48.

As described the coded signal on lines 48 are coupled to the address generator 30. The positive signal on line 67 is transmitted to the case register via latch 96 and line 98. This signal will be transmitted only if a positive potential is applied to line 44a. Thus, for the described embodiment line 44a is maintained positive by the address register 35 (FIG. 2) when the output of the priority resolver is selecting a case register. With a positive signal applied to the case register 32a this register may be accessed on lines 31. When the case register 32a is selected by the priority resolver, line 44b is held low to prevent coupling of a positive potential from lines 106 and 107 to registers 32a or 32b, respectively.

When it becomes necessary to update the routine status information in the registers appropriate signals are applied to lines 44 such that only a single register is selected. The information stored in one or more registers may be changed by the processor during a single segment of a task.

It should be noted that with the dynamic propagate line 50 of FIG. 4 the priority of the dispatcher request input signals is easily resolved with the use of the line 50 and one gate for each of the input signals. This is a substantial reduction in the number of components that would be required if this logic function were implemented with ordinary gates.

Thus a multi-task digital processor which includes a hardware priority resolver has been described. The dispatcher employs a unique logic circuit for resolving the priority of the input signals.

I claim:

1. In an event driven multi-task digital processor which includes a memory programmed with a plurality of routines, each routine for instructing the performance of a task by said processor and each routine including a plurality of predetermined segments, a dispatcher for selecting tasks for said processor comprising:

a priority resolving means for receiving a plurality of externally applied input task request signals and for selecting one of said routines corresponding to the highest priority requested task;

segment storage and selection means for storing signals indicating the next segment to be performed by said processor for each of said routines and for selecting said next segment of said selected routine so as to provide instructions for said processor, said segment storage and selection means coupled to said priority resolving means; and updating means coupled to said segment storage and selection means for updating said stored signals after said selection of said next segment to provide updated ones of said stored signals;

said dispatcher including control means for causing said priority resolving means and said segment storage and selection means to select one of said routines and one of said segments within said selected routine after the completion of each of said segments and when said priority resolving means receives at least one of said task request signals;

whereby said processor completes one of said segments of one of said routines before performing a higher priority task.

2. The dispatcher defined by claim 1 wherein said priority resolving means and said segment storage and selection means are coupled to a program counter which counter is coupled to said memory for providing address signals to said memory so as to obtain said instructions for said selected segment of said selected routine.

3. The dispatcher defined by claim 2 wherein said segment storage and selections means includes a plurality of digital registers for storing said stored signals.

4. In an event driven multi-task digital processor which includes an instruction memory wherein said memory is programmed with a plurality of routines, each routine including the instructions for a task, and wherein said routines include a plurality of predetermined segments; a dispatcher means for providing address signals for the selection of said routines and one of said segments within said selected routine comprising:

priority resolution means for receiving a plurality of externally applied input task request signals and for providing output signals representative of the routine corresponding to the requested task with the highest priority as defined by a predetermined priority scheme;

a plurality of registers each for storing signals representative of one of said segments of one of said routines, said registers coupled to said priority resolution means such that said registers may be selectively accessed in response to said output signals of said priority resolution means; and, coupling means for coupling said output signals of said priority resolution means and said registers with said instruction memory when the instructions corresponding to one of said segments has been executed and when said priority resolution means receives at least one of said request signals;

whereby, based on said predetermined priority scheme, addresses for routines and segments of routines are generated.

5. The dispatcher means defined by claim 4 wherein said coupling means includes a programmed logic array for generating said addresses in response to said output signals of said priority resolution means and said signals stored in said registers.

6. The dispatcher means defined by claim 4 wherein said processor includes means for causing said priority resolution means to provide said output signals at the end of each of said segments of said routines.

7. The dispatcher means defined by claim 4 including means for updating said signals stored in said registers as instructions in said segments are executed by said processor.

8. The dispatcher means defined by claim 4 wherein said priority resolution means includes:

a line;

a plurality of field-effect transistors coupled in series along said line; and, a plurality of logic gates each having a pair of input terminals, one terminal for receiving one of said input signals and the other of said terminals for sensing charge on said line, said logic gates being distributed along said line.

9. The dispatcher means defined by claim 8 wherein each of said logic gates is an active-low AND gate.

* * * * *

UNITED STATES PATENT AND TRADEMARK OFFICE
CERTIFICATE OF CORRECTION

PATENT NO. : 4,152,761
DATED : May 1, 1979
INVENTOR(S) : Glenn Y. Louie

It is certified that error appears in the above-identified patent and that said Letters Patent are hereby corrected as shown below:

| COLUMN | LINE | DESCRIPTION |
|---|---|---|
| 8 | 12 | Delete the number "78" and insert in its place the number --79-- |
| Title Line | | Insert the word --RESOLVER-- after the word "PRIORITY" |

Signed and Sealed this

Fourteenth Day of August 1979

[SEAL]

Attest:

LUTRELLE F. PARKER

*Attesting Officer*   *Acting Commissioner of Patents and Trademarks*